United States Patent
Funk et al.

(10) Patent No.: US 8,785,583 B2
(45) Date of Patent: Jul. 22, 2014

(54) PROCESS FOR CONTINUOUSLY PRODUCING WATER-ABSORBING POLYMER PARTICLES

(75) Inventors: Rüdiger Funk, Niedernhausen (DE); Thomas Pfeiffer, Boehl-Iggelheim (DE); Jürgen Schröder, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 103 days.

(21) Appl. No.: 13/484,849

(22) Filed: May 31, 2012

(65) Prior Publication Data

US 2012/0309917 A1 Dec. 6, 2012

Related U.S. Application Data

(60) Provisional application No. 61/492,826, filed on Jun. 3, 2011.

(51) Int. Cl.
C08F 120/06 (2006.01)

(52) U.S. Cl.
USPC ................ 526/318.4; 526/317.1

(58) Field of Classification Search
USPC ................................... 526/317.1
See application file for complete search history.

(56) References Cited

U.S. PATENT DOCUMENTS

| | | | |
|---|---|---|---|
| 4,914,170 A * | 4/1990 | Chang et al. | 526/240 |
| 6,914,099 B2 * | 7/2005 | Kim | 525/343 |
| 7,420,013 B2 * | 9/2008 | Riegel et al. | 524/556 |
| 2006/0036043 A1 | 2/2006 | Nestler et al. | |
| 2010/0197877 A1 | 8/2010 | Funk | |
| 2010/0298513 A1 | 11/2010 | Heide et al. | |

FOREIGN PATENT DOCUMENTS

| | | |
|---|---|---|
| EP | 0 372 706 A2 | 6/1990 |
| EP | 0 574 260 A1 | 12/1993 |
| JP | 2006219661 A | 8/2006 |
| WO | WO-2004/052949 A1 | 6/2004 |

OTHER PUBLICATIONS

Third Party Observation in international application No. PCT/EP2012/060075, submitted Sep. 27, 2013.
Buchholz, Fredric L., et al. *Modern Superabsorbent Polymer Technology*, "Solution Polymerization: Unit Operations and Their Effect on Product Quality." New York: John Wiley & Sons, Inc., 1998, pp. 71-103.
Fredric L. Buchholz and Andrew T. Graham, Modem Superabsorbent Polymer Technology, pp. 25-28, 1998, Wiley-VCH, New York.

\* cited by examiner

*Primary Examiner* — Vu A Nguyen
(74) *Attorney, Agent, or Firm* — Marshall, Gerstein & Borun LLP

(57) ABSTRACT

A process for continuously producing water-absorbing polymer particles by polymerizing a monomer solution comprising acrylic acid and/or salts thereof, wherein the acrylic acid supplied has a dimeric acrylic acid content of at least 0.02% by weight and the dimeric acrylic acid content is kept essentially constant.

9 Claims, 1 Drawing Sheet

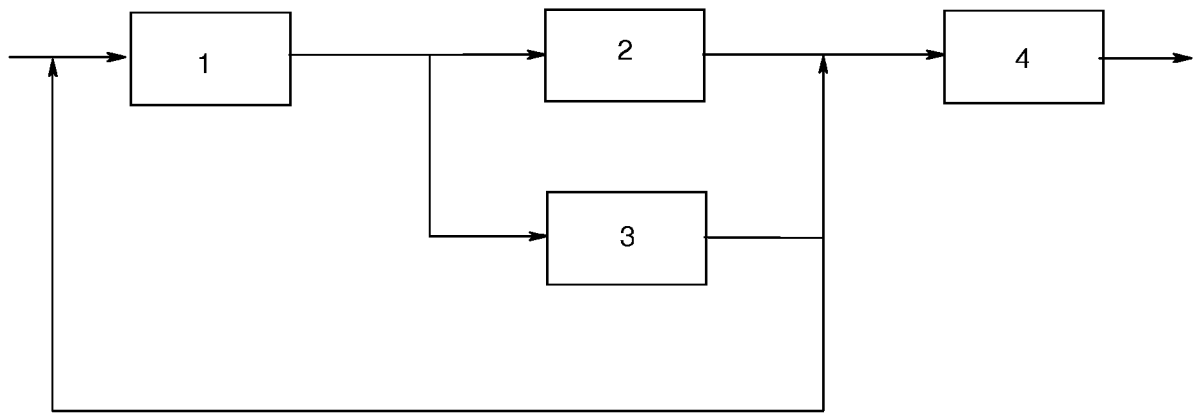

PROCESS FOR CONTINUOUSLY PRODUCING WATER-ABSORBING POLYMER PARTICLES

CROSS-REFERENCE TO RELATED APPLICATIONS

This application claims the benefit of U.S. Provisional Patent Application No. 61/492,826, filed Jun. 3, 2011, incorporated herein by reference in its entirety.

The present invention relates to a process for continuously producing water-absorbing polymer particles by polymerizing a monomer solution comprising acrylic acid and/or salts thereof, wherein the acrylic acid supplied has a dimeric acrylic acid content of at least 0.02% by weight and the dimeric acrylic acid content is kept essentially constant.

The production of water-absorbing polymer particles is described in the monograph "Modern Superabsorbent Polymer Technology", F. L. Buchholz and A. T. Graham, Wiley-VCH, 1998, pages 71 to 103.

The properties of the water-absorbing polymer particles can be adjusted, for example, via the amount of crosslinker used. With an increasing amount of crosslinker, the centrifuge retention capacity (CRC) falls and the absorption under a pressure of 21.0 g/cm² (AUL0.3 psi) passes through a maximum.

To improve the use properties, for example, permeability of the swollen gel bed (SFC) in the diaper and absorption under a pressure of 49.2 g/cm² (AUL0.7 psi), water-absorbing polymer particles are generally surface postcrosslinked. This increases the crosslinking of the particle surface, which can at least partly decouple the absorption under a pressure of 49.2 g/cm² (AUL0.7 psi) and the centrifuge retention capacity (CRC). This surface postcrosslinking can be performed in aqueous gel phase. Preferably, however, dried, ground and sieved polymer particles (base polymer) are surface coated with a surface postcrosslinker and thermally surface postcrosslinked. Crosslinkers suitable for that purpose are compounds which can form covalent bonds to at least two carboxylate groups of the water-absorbing polymer particles.

Water-absorbing polymers are used to produce diapers, tampons, sanitary napkins and other hygiene articles, but also as water-retaining agents in market gardening.

Water-absorbing polymers are produced predominantly by crosslinking polymerization of partly neutralized acrylic acid. However, acrylic acid in the course of storage always forms dimeric acrylic acid. The reaction cannot be suppressed.

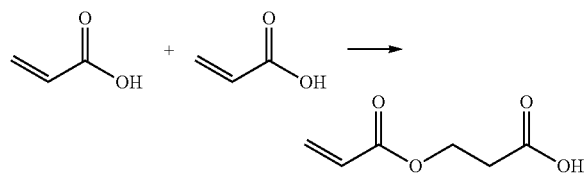

In the course of polymerization, dimeric acrylic acid is incorporated like acrylic acid into the polymer network which forms. At relatively high temperatures, the copolymerized dimeric acrylic acid eliminates acrylic acid again, as a result of which the proportion of unconverted acrylic acid in the water-absorbing polymer is increased. An excessively high proportion of unconverted acrylic acid in the water-absorbing polymer is undesirable, especially in the case of hygiene applications.

To remedy this problem, EP 0 372 706 A1 proposes hydrolyzing the dimeric acrylic acid present in the acrylic acid to be used prior to the polymerization. A disadvantage of this process is that the β-hydroxypropionic acid formed by the hydrolysis can likewise be converted to acrylic acid at relatively high temperatures, and thus leads to an elevated content of unconverted acrylic acid in the water-absorbing polymer. According to EP 0 574 260 A1, only freshly distilled acrylic acid should therefore be used.

A further problem is greatly varying contents of unconverted acrylic acid in the water-absorbing polymers, which can be regarded by customers as indicators of faults during production and further undetected irregularities.

It was an object of the present invention to provide an improved continuous process for producing water-absorbing polymer particles, wherein particularly the residual monomer content can be kept constantly at a low level with low cost and inconvenience.

The object was achieved by a process for producing water-absorbing polymer particles by polymerizing a monomer solution or suspension comprising
a) acrylic acid which may be at least partly neutralized,
b) at least one crosslinker,
c) at least one initiator,
d) optionally one or more ethylenically unsaturated monomers copolymerizable with acrylic acid and
e) optionally one or more water-soluble polymers,
to give a polymer gel, the drying of the resulting polymer gel, the comminution of the dried polymer gel to give polymer particles and the classification of the resulting polymer particles, wherein the acrylic acid is supplied continuously, the acrylic acid supplied continuously has a dimeric acrylic acid content of at least 0.02% by weight and the dimeric acrylic acid content is kept essentially constant.

The present invention is based on the finding that the unconverted acrylic acid content caused by dimeric acrylic acid in the water-absorbing polymer particles can be compensated for by suitable measures, for example optimization of drying or aftertreatment with reducing or oxidizing agents. It is thus also possible to permit a higher content of dimeric acrylic acid. The content of dimeric acrylic acid in the acrylic acid supplied continuously should, though, nevertheless not be too high. The acrylic acid supplied continuously therefore comprises preferably from 0.02 to 1% by weight, more preferably from 0.05 to 0.5% by weight and most preferably from 0.1 to 0.25% by weight of dimeric acrylic acid.

In addition, it is necessary to keep the dimeric acrylic acid content in the acrylic acid supplied continuously essentially constant. Since the content of dimeric acrylic acid affects the unconverted acrylic acid content, the unconverted acrylic acid content in the water-absorbing polymer particles can thus also be kept essentially constant. The dimeric acrylic acid content in the acrylic acid supplied continuously varies within 24 hours by preferably less than 20%, more preferably less than 10%, most preferably less than 5%. For example, in the case of a dimeric acrylic acid content of 0.2% by weight, a variation of less than 10% means a variation in this content within 24 hours by less than 0.02% by weight.

The content of dimeric acrylic acid can be kept essentially constant, for example, by mixing acrylic acid from at least two storage tanks, the acrylic acid in one storage tank having a low dimeric acrylic acid content and the acrylic acid in the other storage tank having a high dimeric acrylic acid content. In the storage tank with a high dimeric acrylic acid content, this content is preferably at least 0.1% by weight, more preferably at least 0.5% by weight and most preferably at least 1% by weight. The dimeric acrylic acid content can be established, for example, by a correspondingly long residence time.

Should the dimeric acrylic acid content in one storage tank be too high, this acrylic acid can be appropriately purified to remove the dimeric acrylic acid, for example by distillation or crystallization.

The use of at least two storage tanks for acrylic acid makes it possible, in a simple manner, to keep the dimeric acrylic acid content essentially constant in the production of water-absorbing polymer particles based on acrylic acid. This can be accomplished by gas chromatography analysis of the acrylic acid in the at least two storage tanks and corresponding regulation of the ratios.

The process according to the invention makes it possible, in a simple manner, to keep the unconverted acrylic acid content in the water-absorbing polymer particles essentially constant. Another possibility, that of analyzing unconverted acrylic acid in the water-absorbing polymer particles with corresponding adjustment of an appropriate aftertreatment, is less suitable due to the more complex and time-consuming analysis. Another possibility, that of an aftertreatment designed for a high content of unconverted acrylic acid, would lead to undesirable variations in unconverted acrylic acid contents.

In a particularly preferred embodiment of the present invention, the water-absorbing polymer particles are surface postcrosslinked. The surface postcrosslinked polymer particles can subsequently be remoisturized, the remoisturization temperature being at least 50° C.

The water-absorbing polymer particles are produced by polymerizing a monomer solution or suspension, and are typically water-insoluble.

Impurities can have a considerable influence on the polymerization. The acrylic acid supplied should therefore have maximum purity. It is therefore often advantageous to specially purify the acrylic acid. Suitable purification processes are described, for example, in WO 2002/055469 A1, WO 2003/078378 A1 and WO 2004/035514 A1.

The acrylic acid typically comprises polymerization inhibitors, preferably hydroquinone monoethers, as storage stabilizers.

The monomer solution comprises preferably up to 250 ppm by weight, preferably at most 130 ppm by weight, more preferably at most 70 ppm by weight, and preferably at least 10 ppm by weight, more preferably at least 30 ppm by weight and especially around 50 ppm by weight, of hydroquinone monoether, based in each case on acrylic acid. For example, an acrylic acid with a suitable hydroquinone monoether content may be used for preparing the monomer solution.

Preferred hydroquinone monoethers are hydroquinone monomethyl ether (MEHQ) and/or alpha-tocopherol (vitamin E).

Suitable crosslinkers b) are compounds having at least two groups suitable for crosslinking. Such groups are, for example, ethylenically unsaturated groups which can be polymerized free-radically into the polymer chain, and functional groups which can form covalent bonds with the acid groups of the monomer a). In addition, polyvalent metal salts which can form coordinate bonds with at least two acid groups of the monomer a) are also suitable as crosslinkers b).

Crosslinkers b) are preferably compounds having at least two polymerizable groups which can be polymerized free-radically into the polymer network. Suitable crosslinkers b) are, for example, ethylene glycol dimethacrylate, diethylene glycol diacrylate, polyethylene glycol diacrylate, allyl methacrylate, trimethylolpropane triacrylate, triallylamine, tetraallylammonium chloride, tetraallyloxyethane, as described in EP 0 530 438 A1, di- and triacrylates, as described in EP 0 547 847 A1, EP 0 559 476 A1, EP 0 632 068 A1, WO 93/21237 A1, WO 2003/104299 A1, WO 2003/104300 A1, WO 2003/104301 A1 and DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/032962 A2.

Preferred crosslinkers b) are pentaerythrityl triallyl ether, tetraallyloxyethane, methylenebismethacrylamide, 15-tuply ethoxylated trimethylolpropane triacrylate, polyethylene glycol diacrylate, trimethylolpropane triacrylate and triallylamine.

Very particularly preferred crosslinkers b) are the polyethoxylated and/or -propoxylated glycerols which have been esterified with acrylic acid or methacrylic acid to give di- or triacrylates, as described, for example, in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol, especially the triacrylate of 3-tuply ethoxylated glycerol.

The amount of crosslinker b) is preferably 0.05 to 1.5% by weight, more preferably 0.1 to 1% by weight and most preferably 0.3 to 0.6% by weight, based in each case on acrylic acid. With rising crosslinker content, the centrifuge retention capacity (CRC) falls and the absorption under a pressure of 21.0 g/cm$^2$ passes through a maximum.

The initiators c) used may be all compounds which generate free radicals under the polymerization conditions, for example thermal initiators, redox initiators or photoinitiators. Suitable redox initiators are sodium peroxodisulfate/ascorbic acid, hydrogen peroxide/ascorbic acid, sodium peroxodisulfate/sodium bisulfite and hydrogen peroxide/sodium bisulfite. Preference is given to using mixtures of thermal initiators and redox initiators, such as sodium peroxodisulfate/hydrogen peroxide/ascorbic acid. The reducing component used is, however, preferably a mixture of the sodium salt of 2-hydroxy-2-sulfinatoacetic acid, the disodium salt of 2-hydroxy-2-sulfonatoacetic acid and sodium bisulfite. Such mixtures are obtainable as Brüggolite® FF6 and Brüggolite® FF7 (Brüggemann Chemicals; Heilbronn; Germany).

Ethylenically unsaturated monomers d) copolymerizable with acrylic acid are, for example, acrylamide, methacrylamide, hydroxyethyl acrylate, hydroxyethyl methacrylate, dimethylaminoethyl methacrylate, dimethylaminoethyl acrylate, dimethylaminopropyl acrylate, diethylaminopropyl acrylate, dimethylaminoethyl methacrylate, diethylaminoethyl methacrylate.

Further ethylenically unsaturated monomers d) copolymerizable with acrylic acid are, for example, ethylenically unsaturated carboxylic acids, such as methacrylic acid and itaconic acid, and also ethylenically unsaturated sulfonic acids, such as styrenesulfonic acid and 2-acrylamido-2-methylpropanesulfonic acid (AMPS).

The water-soluble polymers e) used may be polyvinyl alcohol, polyvinylpyrrolidone, starch, starch derivatives, modified cellulose, such as methylcellulose or hydroxyethylcellulose, gelatin, polyglycols or polyacrylic acids, preferably starch, starch derivatives and modified cellulose.

Typically, an aqueous monomer solution is used. The water content of the monomer solution is preferably from 40 to 75% by weight, more preferably from 45 to 70% by weight and most preferably from 50 to 65% by weight. It is also possible to use monomer suspensions, i.e. monomer solutions with excess sodium acrylate. With rising water content, the energy requirement in the subsequent drying rises, and, with falling water content, the heat of polymerization can only be removed inadequately.

For optimal action, the preferred polymerization inhibitors require dissolved oxygen. The monomer solution can therefore be freed of dissolved oxygen before the polymerization by inertization, i.e. flowing an inert gas through, preferably nitrogen or carbon dioxide. The oxygen content of the monomer solution is preferably lowered before the polymerization to less than 1 ppm by weight, more preferably to less than 0.5 ppm by weight, most preferably to less than 0.1 ppm by weight.

Suitable reactors are, for example, kneading reactors or belt reactors. In the kneader, the polymer gel formed in the polymerization of an aqueous monomer solution or suspension is comminuted continuously by, for example, contrarotatory stirrer shafts, as described in WO 2001/038402 A1. Polymerization on the belt is described, for example, in DE 38 25 366 A1 and U.S. Pat. No. 6,241,928. Polymerization in a belt reactor forms a polymer gel which has to be comminuted in a further process step, for example in an extruder or kneader.

However, it is also possible to dropletize an aqueous monomer solution and to polymerize the droplets obtained in a heated carrier gas stream. It is possible here to combine the process steps of polymerization and drying, as described in WO 2008/040715 A2 and WO 2008/052971 A1.

The acid groups of the resulting polymer gels have typically been partially neutralized. Neutralization is preferably carried out at the monomer stage. This is typically accomplished by mixing in the neutralizing agent as an aqueous solution or preferably also as a solid. The degree of neutralization is preferably from 25 to 95 mol %, more preferably from 30 to 80 mol % and most preferably from 40 to 75 mol %, for which the customary neutralizing agents can be used, preferably alkali metal hydroxides, alkali metal oxides, alkali metal carbonates or alkali metal hydrogencarbonates and also mixtures thereof. Instead of alkali metal salts, it is also possible to use ammonium salts. Particularly preferred alkali metals are sodium and potassium, but very particular preference is given to sodium hydroxide, sodium carbonate or sodium hydrogencarbonate and also mixtures thereof.

However, it is also possible to carry out neutralization after the polymerization, at the stage of the polymer gel formed in the polymerization. It is also possible to neutralize up to 40 mol %, preferably from 10 to 30 mol % and more preferably from 15 to 25 mol % of the acid groups before the polymerization by adding a portion of the neutralizing agent actually to the monomer solution and setting the desired final degree of neutralization only after the polymerization, at the polymer gel stage. When the polymer gel is neutralized at least partly after the polymerization, the polymer gel is preferably comminuted mechanically, for example by means of an extruder, in which case the neutralizing agent can be sprayed, sprinkled or poured on and then carefully mixed in. To this end, the gel mass obtained can be repeatedly extruded for homogenization.

The polymer gel is then preferably dried with a belt drier until the residual moisture content is preferably 0.5 to 15% by weight, more preferably 1 to 10% by weight and most preferably 2 to 8% by weight, the residual moisture content being determined by EDANA recommended test method No. WSP 230.2-05 "Moisture Content". In the case of too high a residual moisture content, the dried polymer gel has too low a glass transition temperature $T_g$ and can be processed further only with difficulty. In the case of too low a residual moisture content, the dried polymer gel is too brittle and, in the subsequent comminution steps, undesirably large amounts of polymer particles with an excessively low particle size are obtained ("fines"). The solids content of the gel before the drying is preferably from 25 to 90% by weight, more preferably from 35 to 70% by weight and most preferably from 40 to 60% by weight. However, a fluidized bed drier or a paddle drier may optionally also be used for drying purposes.

Thereafter, the dried polymer gel is ground and classified, and the apparatus used for grinding may typically be single or multistage roll mills, preferably two or three-stage roll mills, pin mills, hammer mills or vibratory mills.

The mean particle size of the polymer particles removed as the product fraction is preferably at least 200 µm, more preferably from 250 to 600 µm and very particularly from 300 to 500 µm. The mean particle size of the product fraction may be determined by means of EDANA recommended test method No. WSP 220.2-05 "Particle Size Distribution", where the proportions by mass of the screen fractions are plotted in cumulated form and the mean particle size is determined graphically. The mean particle size here is the value of the mesh size which gives rise to a cumulative 50% by weight.

The proportion of particles with a particle size of at least 150 µm is preferably at least 90% by weight, more preferably at least 95% by weight, most preferably at least 98% by weight.

Polymer particles with too small a particle size lower the permeability (SFC). The proportion of excessively small polymer particles ("fines") should therefore be low.

Excessively small polymer particles are therefore typically removed and recycled into the process. This is preferably done before, during or immediately after the polymerization, i.e. before the drying of the polymer gel. The excessively small polymer particles can be moistened with water and/or aqueous surfactant before or during the recycling.

It is also possible to remove excessively small polymer particles in later process steps, for example after the surface postcrosslinking or another coating step. In this case, the excessively small polymer particles recycled are surface postcrosslinked or coated in another way, for example with fumed silica.

When a kneading reactor is used for polymerization, the excessively small polymer particles are preferably added during the last third of the polymerization.

When the excessively small polymer particles are added at a very early stage, for example actually to the monomer solution, this lowers the centrifuge retention capacity (CRC) of the resulting water-absorbing polymer particles. However, this can be compensated for, for example, by adjusting the amount of crosslinker b) used.

When the excessively small polymer particles are added at a very late stage, for example not until an apparatus connected downstream of the polymerization reactor, for example an extruder, the excessively small polymer particles can be incorporated into the resulting polymer gel only with difficulty. Insufficiently incorporated, excessively small polymer particles are, however, detached again from the dried polymer gel during the grinding, are therefore removed again in the course of classification and increase the amount of excessively small polymer particles to be recycled.

The proportion of particles having a particle size of at most 850 µm is preferably at least 90% by weight, more preferably at least 95% by weight, most preferably at least 98% by weight.

Advantageously, the proportion of particles having a particle size of at most 600 µm is preferably at least 90% by weight, more preferably at least 95% by weight, most preferably at least 98% by weight.

Polymer particles of excessively large particle size lower the free swell rate. The proportion of excessively large polymer particles should therefore likewise be small.

Excessively large polymer particles are therefore typically removed and recycled into the grinding of the dried polymer gel.

To further improve the properties, the polymer particles can be surface postcrosslinked. Suitable surface postcrosslinkers are compounds which comprise groups which can form covalent bonds with at least two carboxylate groups of the polymer particles. Suitable compounds are, for example, polyfunctional amines, polyfunctional amido amines, polyfunctional epoxides, as described in EP 0 083 022 A2, EP 0 543 303 A1 and EP 0 937 736 A2, di- or polyfunctional alcohols, as described in DE 33 14 019 A1, DE 35 23 617 A1 and EP 0 450 922 A2, or β-hydroxyalkylamides, as described in DE 102 04 938 A1 and U.S. Pat. No. 6,239, 230.

Additionally described as suitable surface postcrosslinkers are cyclic carbonates in DE 40 20 780 C1, 2-oxazolidone and its derivatives, such as 2-hydroxyethyl-2-oxazolidone in DE 198 07 502 A1, bis- and poly-2-oxazolidinones in DE 198 07 992 C1, 2-oxotetrahydro-1,3-oxazine and its derivatives in DE 198 54 573 A1, N-acyl-2-oxazolidones in DE 198 54 574 A1, cyclic ureas in DE 102 04 937 A1, bicyclic amide acetals in DE 103 34 584 A1, oxetanes and cyclic ureas in EP 1 199 327 A2 and morpholine-2,3-dione and its derivatives in WO 2003/031482 A1.

Preferred surface postcrosslinkers are ethylene carbonate, ethylene glycol diglycidyl ether, reaction products of polyamides with epichlorohydrin and mixtures of propylene glycol and 1,4-butanediol.

Very particularly preferred surface postcrosslinkers are 2-hydroxyethyloxazolidin-2-one, oxazolidin-2-one and 1,3-propanediol.

In addition, it is also possible to use surface postcrosslinkers which comprise additional polymerizable ethylenically unsaturated groups, as described in DE 37 13 601 A1.

The amount of surface postcrosslinker is preferably 0.001 to 2% by weight, more preferably 0.02 to 1% by weight and most preferably 0.05 to 0.2% by weight, based in each case on the polymer particles.

In a preferred embodiment of the present invention, polyvalent cations are applied to the particle surface in addition to the surface postcrosslinkers before, during or after the surface postcrosslinking.

The polyvalent cations usable in the process according to the invention are, for example, divalent cations such as the cations of zinc, magnesium, calcium, iron and strontium, trivalent cations such as the cations of aluminum, iron, chromium, rare earths and manganese, tetravalent cations such as the cations of titanium and zirconium. Possible counterions are chloride, bromide, sulfate, hydrogensulfate, carbonate, hydrogencarbonate, nitrate, phosphate, hydrogenphosphate, dihydrogenphosphate and carboxylate, such as acetate and lactate. Aluminum sulfate and aluminum lactate are preferred. Apart from metal salts, it is also possible to use polyamines as polyvalent cations.

The amount of polyvalent cation used is, for example, 0.001 to 1.5% by weight, preferably 0.005 to 1% by weight and more preferably 0.02 to 0.8% by weight, based in each case on the polymer particles.

The surface postcrosslinking is typically performed in such a way that a solution of the surface postcrosslinker is sprayed onto the dried polymer particles. After the spray application, the polymer particles coated with surface postcrosslinker are dried thermally, and the surface postcrosslinking reaction can take place either before or during the drying.

The spray application of a solution of the surface postcrosslinker is preferably performed in mixers with moving mixing tools, such as screw mixers, disk mixers and paddle mixers. Particular preference is given to horizontal mixers such as paddle mixers, very particular preference to vertical mixers. The distinction between horizontal mixers and vertical mixers is made by the position of the mixing shaft, i.e. horizontal mixers have a horizontally mounted mixing shaft and vertical mixers a vertically mounted mixing shaft. Suitable mixers are, for example, horizontal Pflugschar® plowshare mixers (Gebr. Lödige Maschinenbau GmbH; Paderborn; Germany), Vrieco-Nauta continuous mixers (Hosokawa Micron BV; Doetinchem; the Netherlands), Processall Mixmill mixers (Processall Incorporated; Cincinnati; USA) and Schugi Flexomix® (Hosokawa Micron BV; Doetinchem; the Netherlands). However, it is also possible to spray on the surface postcrosslinker solution in a fluidized bed.

The surface postcrosslinkers are typically used in the form of an aqueous solution. The penetration depth of the surface postcrosslinker into the polymer particles can be adjusted via the content of nonaqueous solvent and total amount of solvent.

When exclusively water is used as the solvent, a surfactant is advantageously added. This improves the wetting behavior and reduces the tendency to form lumps. However, preference is given to using solvent mixtures, for example isopropanol/water, 1,3-propanediol/water and propylene glycol/water, where the mixing ratio in terms of mass is preferably from 20:80 to 40:60.

The thermal drying is preferably carried out in contact driers, more preferably paddle driers, most preferably disk driers. Suitable driers are, for example, Hosokawa Bepex® Horizontal Paddle Dryer (Hosokawa Micron GmbH; Leingarten; Germany), Hosokawa Bepex® Disc Dryer (Hosokawa Micron GmbH; Leingarten; Germany) and Nara Paddle Dryer (NARA Machinery Europe; Frechen; Germany). Moreover, fluidized bed driers may also be used.

The drying can be effected in the mixer itself, by heating the jacket or blowing in warm air. Equally suitable is a downstream dryer, for example a shelf drier, a rotary tube oven or a heatable screw. It is particularly advantageous to effect mixing and drying in a fluidized bed drier.

Preferred drying temperatures are in the range of 100 to 250° C., preferably 120 to 220° C., more preferably 130 to 210° C. and most preferably 150 to 200° C. The preferred residence time at this temperature in the reaction mixer or drier is preferably at least 10 minutes, more preferably at least 20 minutes, most preferably at least 30 minutes, and typically at most 60 minutes.

Subsequently, the surface postcrosslinked polymer particles can be classified again, excessively small and/or excessively large polymer particles being removed and recycled into the process.

To further improve the properties, the surface postcrosslinked polymer particles can be coated or remoisturized. Suitable coatings for improving the swell rate and the permeability (SFC) are, for example, inorganic inert substances, such as water-insoluble metal salts, organic polymers, cationic polymers and di- or polyvalent metal cations. Suitable coatings for dust binding are, for example, polyols. Suitable coatings for counteracting the undesired caking tendency of the polymer particles are, for example, fumed silica, such as Aerosil® 200, and surfactants, such as Span® 20.

The water-absorbing polymer particles produced by the process according to the invention have a moisture content of preferably 0 to 15% by weight, more preferably 1 to 10% by weight and most preferably 2 to 8% by weight, the water content being determined by EDANA recommended test method No. WSP 230.2-05 "Moisture Content".

The water-absorbing polymer particles produced by the process according to the invention have a centrifuge retention capacity (CRC) of typically at least 15 g/g, preferably at least 20 g/g, more preferably at least 22 g/g, especially preferably at least 24 g/g and most preferably at least 26 g/g. The centrifuge retention capacity (CRC) of the water-absorbing polymer particles is typically less than 60 g/g. The centrifuge retention capacity (CRC) is determined by EDANA recommended test method No. WSP 241.2-05 "Centrifuge Retention Capacity".

The water-absorbing polymer particles produced by the process according to the invention have an absorption under a pressure of 49.2 g/cm$^2$ of typically at least 15 g/g, preferably at least 20 g/g, more preferably at least 22 g/g, especially preferably at least 24 g/g and most preferably at least 26 g/g. The absorption under a pressure of 49.2 g/cm$^2$ of the water-absorbing polymer particles is typically less than 35 g/g. The absorption under a pressure of 49.2 g/cm$^2$ is determined analogously to EDANA recommended test method No. WSP 242.2-05 "Absorption under Pressure", except that a pressure of 49.2 g/cm$^2$ is established instead of a pressure of 21.0 g/cm$^2$.

The present invention further provides an apparatus for performance of the process according to the invention.

The inventive apparatus for continuous production of water-absorbing polymer particles comprises at least two parallel storage tanks for acrylic acid, at least one polymerization reactor, at least one forced air belt drier, at least one roll mill and at least one tumbling sieving machine.

At least one storage tank can preferably be thermostated to a temperature of 15 to 25° C. and/or has a capacity of at least 100 m$^3$.

In a particularly preferred embodiment of the present invention, at least one storage tank has a recycle line to an apparatus for purification of acrylic acid. FIG. 1 shows one possible connection of this preferred embodiment, with the reference numerals having the following meanings:

1 storage tank for purification of acrylic acid
2 storage tank 1
3 storage tank 2
4 apparatus for production of water-absorbing polymer particles The apparatus for purification of acrylic acid may be a distillation or crystallization. Both types of purification are suitable for lowering the dimeric acrylic acid content.

Most preferably, the inventive apparatus additionally has an apparatus for surface postcrosslinking.

Methods:

The standard test methods described hereinafter and designated "WSP" are described in: "Standard Test Methods for the Nonwovens Industry", 2005 edition, published jointly by the Worldwide Strategic Partners EDANA (Avenue Eugéne Plasky, 157, 1030 Brussels, Belgium, www.edana.org) and INDA (1100 Crescent Green, Suite 115, Cary, N.C. 27518, U.S.A., www.inda.org). This publication is available both from EDANA and from INDA.

The measurements should, unless stated otherwise, be carried out at an ambient temperature of 23±2° C. and a relative air humidity of 50±10%. The water-absorbing polymer particles are mixed thoroughly before the measurement.

Residual Monomers

The residual monomers in the water-absorbing polymer particles are determined by EDANA recommended test method No. WSP 210.2-05 "Residual Monomers".

EXAMPLES

Production of the Base Polymers

Example 1

A mixture, partially neutralized to a neutralization level of 70 mol %, of 96 g of acrylic acid, 785 g of sodium acrylate solution (37.3% by weight of sodium acrylate, dissolved in water) and 115 g of deionized water (the mixture had a content of dimeric acrylic acid of 127 ppm) and 0.88 g of ethoxylated glyceryl triacrylate (3 equivalents of ethylene oxide per equivalent of glycerol) was freed of atmospheric oxygen present with nitrogen gas at 23°±1° C. in a polyethylene beaker with a capacity of 2 liters for 30 minutes. Subsequently, the polymerization was initiated by admixing the stirred mixture at 23°±1° C. with 2.34 g of sodium peroxodisulfate solution (10% by weight in deionized water), 1.50 g of ascorbic acid solution (1% by weight in deionized water) and 1.50 g of H2O2 solution (1% by weight in deionized water). The temperature maximum of approx. 108° C. was attained after approx. 25 minutes. 60 minutes after the start of the polymerization, the resulting polymer gel was comminuted with an extruder, dried in a forced air drying cabinet at 150° C. for 60 minutes, ground three times with a roll mill (gap widths: 1000 μm, 600 μm and 400 μm) and sieved to a particle size range from 150 to 850 μm.

Based on 100 g of this base polymer (1-B), the surface of the particles was contacted in a mixing unit (Waring® Blender) with a solution of 0.1 g of N-(2-hydroxyethyl)-2-oxazolidinone, 0.1 g of 1,3-propanediol and 3.8 g of a water/isopropanol mixture (70/30) and then heated to 180° C. for 60 minutes. Any agglomerates formed were removed with a sieve of mesh size 850 μm.

The residual monomer content of the base polymer (1-B) was 682 ppm; that of the surface postcrosslinked polymer (1) was 717 ppm.

Example 2a

Example 1 was repeated, but with a content of dimeric acrylic acid in the mixture of 688 ppm.

The residual monomer content of the base polymer (2a-B) was 1052 ppm; that of the surface postcrosslinked polymer (2a) was 1578 ppm.

Example 2b

Example 1 was repeated with three times the amount of feedstocks in a polyethylene beaker with a capacity of 5 liters. The content of dimeric acrylic acid in the mixture was likewise 688 ppm. In the course of polymerization, a temperature maximum of approx. 109° C. was attained.

The residual monomer content of the base polymer (2b-B) was 980 ppm; that of the surface postcrosslinked polymer (2b) was 1522 ppm.

Example 3a

The surface postcrosslinked polymer (2a) from example 2a was divided into equal portions and each portion was admixed with different amounts of aqueous sodium bisulfite solution under identical conditions in a mixing unit (Waring® Blender).

The samples admixed with NaHSO3 solution were heated to 80° C. for 180 minutes. Subsequently, the residual monomer content of the aftertreated polymers (3a-1) to (3a-4) was determined. The results are summarized in Table 1.

Example 3b

The surface postcrosslinked polymer (2b) from example 2b was divided into equal portions and each portion was admixed with different amounts of aqueous sodium bisulfite solution under identical conditions in a mixing unit (Waring® Blender).

The samples admixed with $NaHSO_3$ solution were heated to 150° C. for 60 minutes. Subsequently, the residual monomer content of the aftertreated polymers (3b-1) to (3b-4) was determined. The results are summarized in Table 1.

Example 4a

The surface postcrosslinked polymer (2b) from example 2b, divided into equal portions as described in example 3b, was admixed with different amounts of aqueous sodium peroxodisulfate solution.

The samples admixed with $Na_2S_2O_8$ solution were heated to 80° C. for 180 minutes. Subsequently, the residual monomer content of the aftertreated polymers (4a-1) to (4a-4) was determined. The results are summarized in Table 1.

Example 4b

The surface postcrosslinked polymer (2b) from example 2b, divided into equal portions as described in example 3b, was admixed with different amounts of aqueous sodium peroxodisulfate solution.

The samples admixed with $Na_2S_2O_8$ solution were heated to 150° C. for 60 minutes. Subsequently, the residual monomer content of the aftertreated polymers (4b-1) to (4b-4) was determined. The results are summarized in Table 1.

The percentages are percentages by weight based on the polymer used.

Examples 1 to 4 show that a higher dimeric acrylic acid content can be compensated for by an appropriate aftertreatment.

Examples 5 to 7

The production conditions described in example 2b, with reference to example 1, for the polymerization, the comminution of the polymer gel, the grinding and the sieving were repeated under identical conditions, except that the monomer mixtures of examples 5 to 7 had different contents of dimeric acrylic acid. The conditions of the drying and the residual monomer contents of the individual samples are summarized in table 2.

In the variation of the drying, identical amounts of sample were always distributed homogeneously in a thin layer (about gel particle thickness) on sieve trays and dried in a forced air drying cabinet.

TABLE 2

Influence of drying conditions

| Example | Content of dimeric acrylic acid [ppm] | Drying temperature [° C.] | Drying time [min] | Residual monomer content [ppm] |
|---|---|---|---|---|
| 5 | 266 | 170 | 80 | 578 |
| 6 | 657 | 170 | 80 | 1205 |
|   |     |     | 60 | 1187 |
|   |     |     | 40 | 1005 |
|   |     | 160 | 80 | 1048 |
|   |     |     | 60 | 987 |
|   |     |     | 40 | 891 |
|   |     | 150 | 80 | 1031 |
|   |     |     | 60 | 827 |
|   |     |     | 40 | 755 |
| 7 | 998 | 170 | 80 | 1833 |
|   |     |     | 60 | 1776 |
|   |     |     | 40 | 1661 |
|   |     | 160 | 80 | 1679 |

TABLE 1

Influence of aftertreatment on residual monomer content

| Polymer | Water [%] | NaHSO$_3$ [%] | Na$_2$S$_2$O$_8$ [%] | Aftertreatment temperature [° C.] | Aftertreatment time [min] | Residual monomer content [ppm] |
|---|---|---|---|---|---|---|
| (1)    | —  | —   | —   | —   | —   | 717  |
| (2a)   | —  | —   | —   | —   | —   | 1578 |
| (2b)   | —  | —   | —   | —   | —   | 1522 |
| (3a-1) | 20 | 0   | —   | 80  | 180 | 1263 |
| (3b-1) | 20 | 0   | —   | 150 | 60  | 1227 |
| (3a-2) | 20 | 0.5 | —   | 80  | 180 | 772  |
| (3b-2) | 20 | 0.5 | —   | 150 | 60  | 777  |
| (3a-3) | 60 | 0   | —   | 80  | 180 | 1076 |
| (3b-3) | 60 | 0   | —   | 150 | 60  | 1059 |
| (3a-4) | 60 | 0.5 | —   | 80  | 180 | 243  |
| (3b-4) | 60 | 0.5 | —   | 150 | 60  | 174  |
| (4a-1) | 20 | —   | 0   | 80  | 180 | 1353 |
| (4b-1) | 20 | —   | 0   | 150 | 60  | 1353 |
| (4a-2) | 20 | —   | 0.1 | 80  | 180 | 1238 |
| (4b-2) | 20 | —   | 0.1 | 150 | 60  | 1101 |
| (4a-3) | 60 | —   | 0   | 80  | 180 | 1140 |
| (4b-3) | 60 | —   | 0   | 150 | 60  | 1122 |
| (4a-4) | 60 | —   | 0.1 | 80  | 180 | 1095 |
| (4b-4) | 60 | —   | 0.1 | 150 | 60  | 517  |

TABLE 2-continued

Influence of drying conditions

| Example | Content of dimeric acrylic acid [ppm] | Drying temperature [° C.] | Drying time [min] | Residual monomer content [ppm] |
|---|---|---|---|---|
| | | | 60 | 1546 |
| | | | 40 | 1460 |
| | | 150 | 80 | 1555 |
| | | | 60 | 1201 |
| | | | 40 | 1132 |

Examples 5 to 7 show that a higher dimeric acrylic acid content can be compensated for by an appropriate adjustment of the drying conditions.

The invention claimed is:

1. A process for continuously producing water-absorbing polymer particles, comprising polymerization of a monomer solution or suspension comprising
    a) acrylic acid which may be at least partly neutralized,
    b) at least one crosslinker,
    c) at least one initiator,
    d) optionally one or more ethylenically unsaturated monomer copolymerizable with acrylic acid, and
    e) optionally one or more water-soluble polymer, to give a polymer gel, drying the resulting polymer gel, comminution of the dried polymer gel to give polymer particles, and classifying the resulting polymer particles, wherein the acrylic acid is supplied continuously and the acrylic acid supplied continuously has a dimeric acrylic acid content of 0.02% to 1% by weight and the dimeric acrylic acid content is kept essentially constant.

2. The process according to claim 1, wherein the dimeric acrylic acid content in the the acrylic acid supplied continuously varies by less than 10% within 24 hours.

3. The process according to claim 1, wherein acrylic acid from at least two storage tanks is used.

4. The process according to claim 2, wherein the acrylic acid in one of the storage tanks has a dimeric acrylic acid content of at least 0.1% by weight.

5. The process according to claim 1, wherein the water-absorbing polymer particles are surface postcrosslinked.

6. The process according to claim 1, wherein the water-absorbing polymer particles are surface postcrosslinked and remoisturized.

7. The process according to claim 1, wherein the water-absorbing polymer particles are surface postcrosslinked and remoisturized at a temperature of at least 50° C.

8. The process according to claim 1, wherein the water-absorbing polymer particles have a water content of 1 to 10% by weight.

9. The process according to claim 1, wherein the water-absorbing polymer particles have a centrifuge retention capacity of at least 15 g/g.

* * * * *